Patented Oct. 2, 1928.

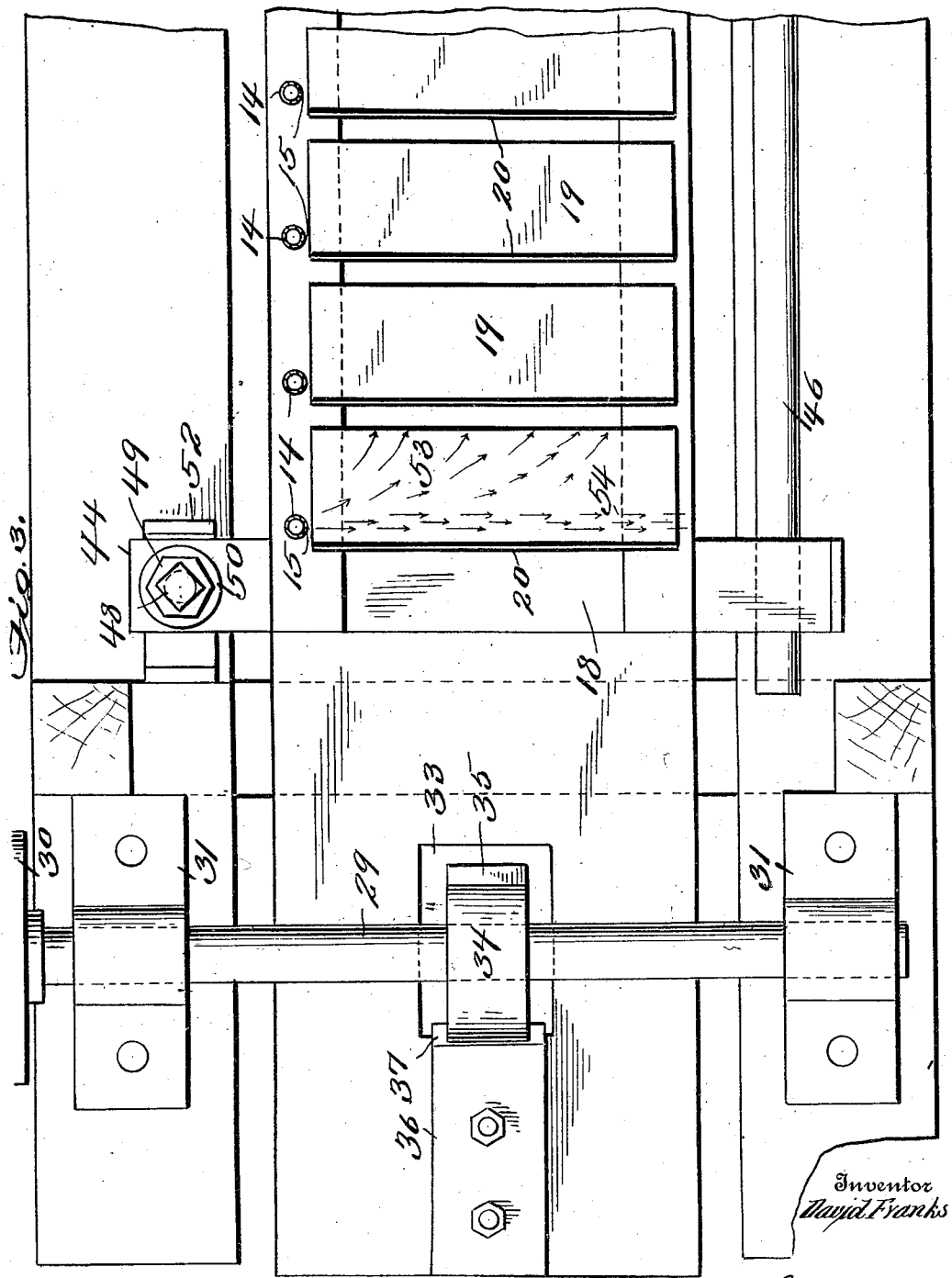

1,686,374

UNITED STATES PATENT OFFICE.

DAVID FRANKS, OF MILLERSBURG, OHIO, ASSIGNOR OF ONE-THIRD TO CHARLES K. FRANKS AND ONE-THIRD TO SAMUEL FRANKS, JR., BOTH OF MILLERSBURG, OHIO.

MACHINE FOR SEPARATING SEEDS.

Application filed July 29, 1927. Serial No. 209,263.

This invention relates to a machine for separating weed seeds from other seeds, and the primary object of the invention is to provide a series of separating elements consisting of reciprocating flat plates to which the weed seeds mixed with the seed sought to be recovered are fed, the weed seeds moving over each plate in one direction and the seeds to be recovered in another direction to effect a positive separation.

A further object of the invention is to provide a machine of the class specified wherein is included in compact structure a frame having therein rows or tiers of plates composing superposed decks which are disposed at an angle, and each row or tier operating as a unit separate from the remaining plates included in the machine but all depositing the weed seeds in one outlet and the seeds sought to be recovered in another outlet.

A further object of the invention is to provid a machine of the class specified including a frame having therein rows of tiers of plates which may be adjusted to vary the angle thereof relatively to a horizontal plane by slightly raising one end of the frame through a simple adjustable means and uniformly raising all of the plates included in the structural capacity of the machine at the same angle as the frame, and whereby the plates are slanted downwardly in two directions, the one angle of all the plates being upwardly at the forward ends and downwardly in a plane at right angles to the forward ends and whereby the separated seeds are caused to gravitate and an effective separation thereby secured.

The improved machine consists essentially of a frame supporting a series of plates arranged in rows or tiers with reduced spaces therebetween, or disposing the plates in the form of superposed decks, a track within which the frame is mounted as well as adjusting means for raising and lowering the frame to uniformly modify the angle of all the plates relatively to the frame and to feed the superposed plates individually and regularly with the seeds to be separated and to carry off the separated seeds in such manner that they may be easily removed and distributed and destroyed as may be desired.

The invention also consists in the details of construction and arrangement of the several parts which will be more fully hereinafter described and claimed.

In the drawings:—

Fig. 3 is a horizontal section, on an enlarged scale of a portion of the machine above the bed and showing a part of the plates and the feeding means therefor, together with the machanism for effecting a uniform reciprocation of all the plates.

Figure 1:
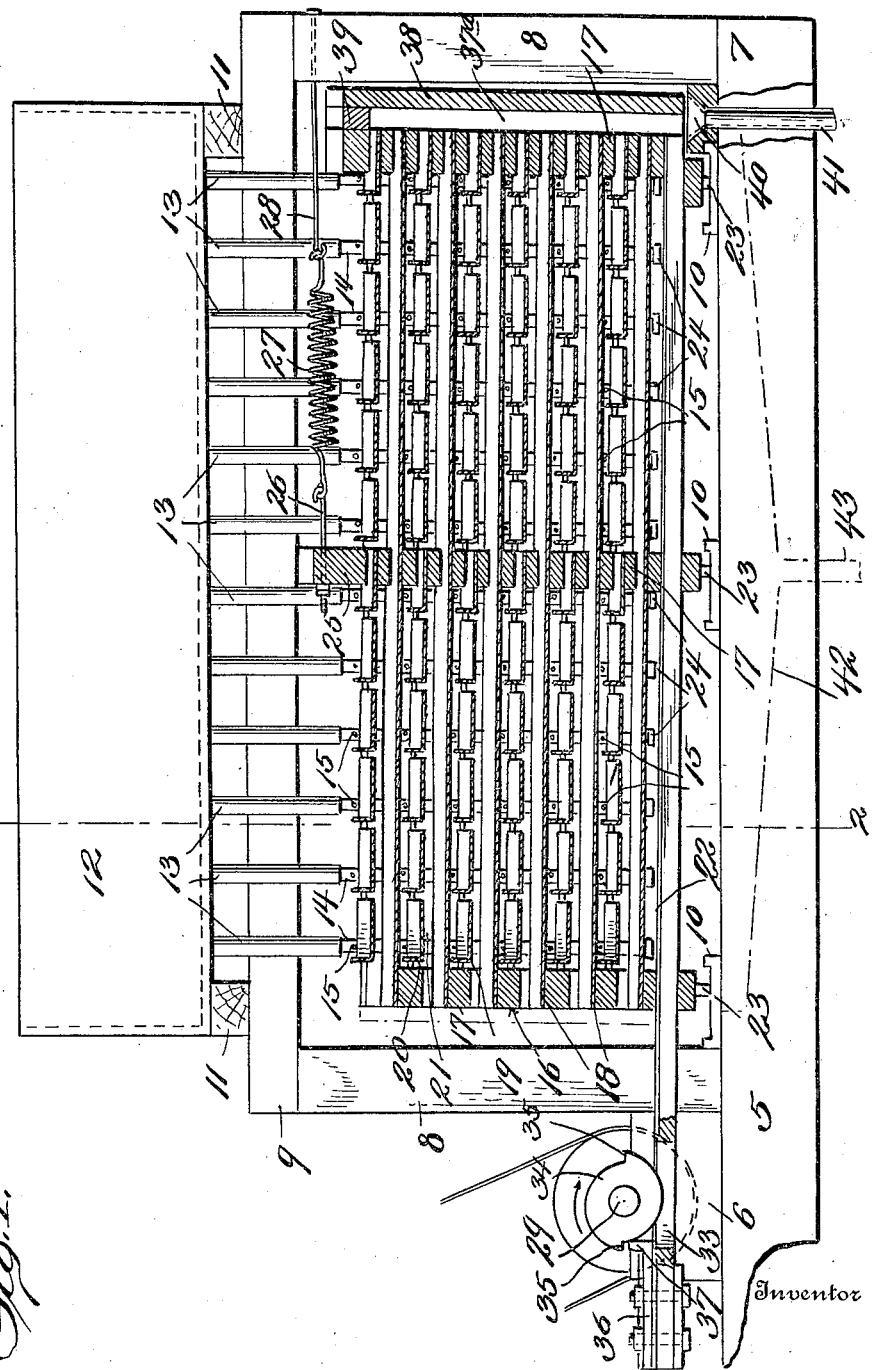
Fig. 1 is a longitudinal sectional elevation, partially broken away, of a machine embodying the features of the invention.
Figure 2:
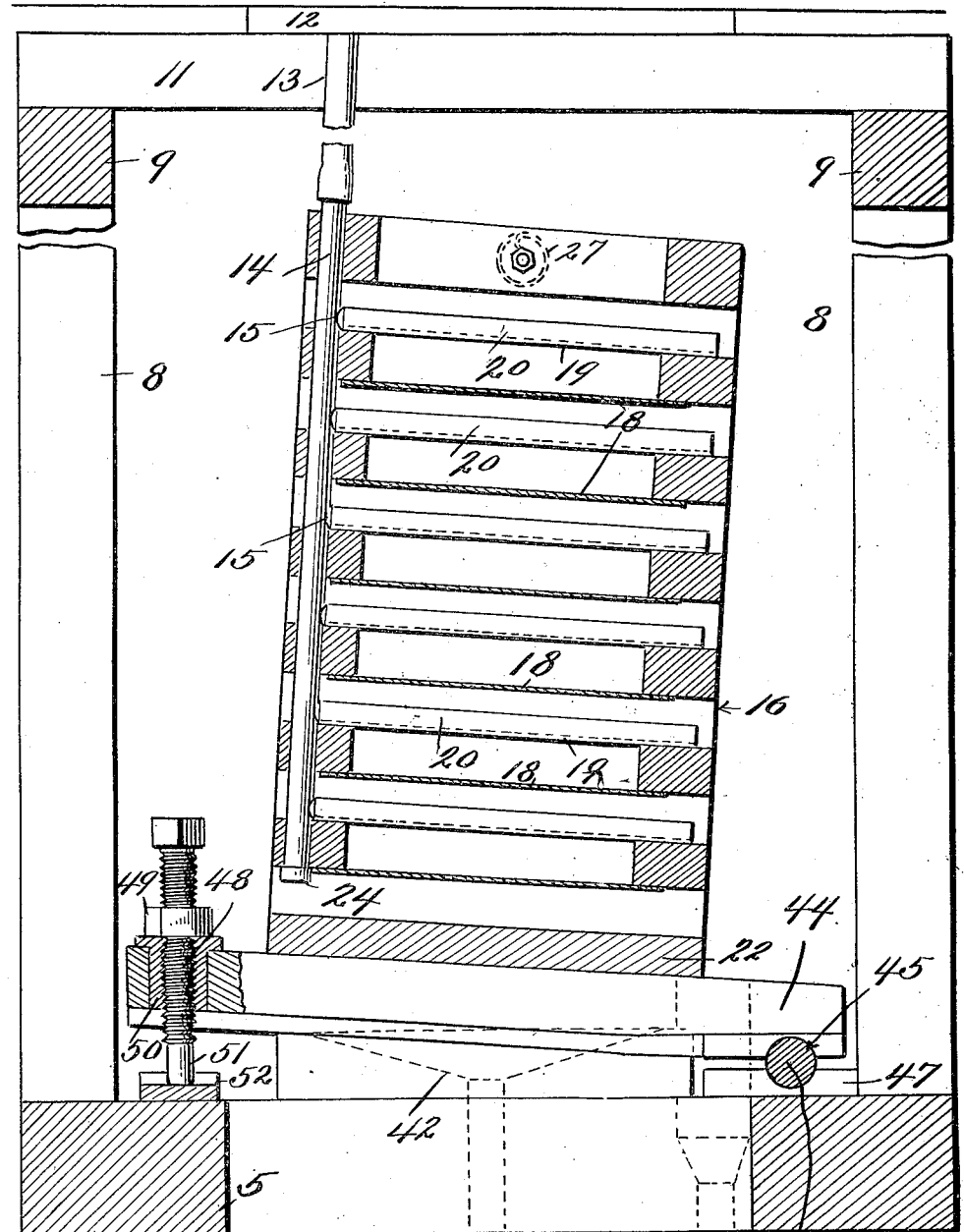
Fig. 2 is a transverse vertical section on the line 2, 2, Fig. 1.

The numeral 5 designates a base which may be of any preferred construction and adjacent to the ends has cross sills 6 and 7 and on the base is erected the superstructure consisting of uprights 8 and a top 9. This frame will be of a form adapted for the purpose and strengthened or reinforced at various points found necessary to resist the vibration and other stress to which the same is subjected by the operation of the machine. On the base 5 are transversely extending, horizontally arranged tracks 10, there being three of these tracks shown, but the number may be increased or decreased in proportion to the remaining dimensions of the machine. Suitable cross members 11 are mounted on the top 9 and support a seed bin or hopper 12 from the bottom of which depends a series of elastic feed tubes 13 connected at their lower ends to metal feed tubes 14 having openings 15 in the inner portions thereof at regular spaced intervals and close to one side of an inner reciprocating carrier 16 consisting of a frame with end and intermediate supports 17 to which are connected a series of substantially horizontal partitions 18, as clearly shown by Figs. 1 and 2, and between these partitions are secured a series of separators 19 having flanges 20 at one end, said separators being supported by the supports 17, as shown by Fig. 2 and constructed from suitable flat metal plates. These separators or plates 19 are spaced apart at their ends to form discharge openings 21, and in cooperation with the series or tiers of these plates are the said openings 15 in the metal feed pipes 14. The supports 17 at their lower ends below the lower partition 18, or the bed 22 of the carrier 16, are provided with slides 23 which engage the tracks 10. The lower ends of the metal feed tubes 14 are capped or closed, as at 24, and the seed to be separated is fed through the flexible tubes 13 into the rigid or metal tubes 14 and regularly deposited on the separators or plates 19 throughout the whole length and vertical extent of the carrier 16. The intermediate support 17 is extended at its upper end, as at 25, and thereto is connected a link rod 26 attached to the inner end of a spring 27 having its opposite end connected by a link rod 28 to the one end of the frame enclosing the carrier 16, as clearly shown by Fig. 2. The spring 27 offers a resistance to the reciprocation to the left of the carrier 16, or stresses in opposition to mechanism for forcing the carrier 16 to the right, said mechanism comprising a cross shaft 29 with a drive pulley 30 on one end thereof, said shaft being mounted in suitable bearings 31 secured to a transversely extending block frame 31′ at the center of one end of the machine and located exteriorly of one end of the frame or adjacent to one set of uprights 8. A bed 22 extends and is movable through the block frame and has an opening 33 therein. Over the opening 33 a double snail cam 34 is mounted on the shaft 29, and the drops 35 thereof are adapted to engage the inner angular terminal 37 of a striker plate 36 adjacent to the cam, and by means of which the bed frame 22 forming part of the carrier 16 is given a dual operation at each complete rotation of the shaft 29, the spring 27 restoring the carrier 16 to normal position after each operation of the cam 34. The partitions 18 extend through the supports 17 of the carrier, but are normally lower at one end of the carrier than at the opposite end, the lower ends of these partitions opening into a discharge passage 37ª formed at one end of the carrier and having a wall 38 spaced from the adjacent support 17 and provided with a top support 39, as shown by Fig. 1. The passage 37ª is common to all the tiers of partitions between the separators or plates 19, and the unflanged ends of said plates are directed toward this passage, that is to say, the separating plates 19 adjacent to the discharge spaces 21 are without flanges, whereas the flanges 20 at the opposite ends of said plates are located adjacent to the feed openings 15. At the lower end of the passage 37ª is a discharge hopper 40 with a depending pipe 41 for carrying off the weed seeds, or the seeds that are separated from the seeds desired to be conserved. At one side of the carrier 16 below the bed plate 22 and supported by the base 5 is a discharge hopper 42 with a depending pipe 43 to receive the seed sought to be conserved and separated from the weed or other seeds.

The bed plate 22 has a cross beam 44 attached thereto and at one end is recessed, as at 45, to engage a fulcrum shaft 46 supported therebelow on the base in pillow blocks 47, and at the opposite end the beam has a vertically disposed adjusting screw 48 with a jam nut 49 thereon, the screw 48 engaging a metal bushing 50 secured in the end of the beam 44, the beam 44 reciprocating with the bed plate 22, and the screw 48 having a lower reduced unthreaded terminal 51 slidably engaging a track 52 supported on the base and whereby beam 44 and screw 48 are movable with the bed plate 22 and the carrier 16. This screw 48 is adjusted vertically to cant or incline the carrier 16 as a whole and correspondingly incline the plates 19 and partitions 18, as clearly shown by Fig. 2, the bed plate 22 and beam 44 fulcruming on the shaft 46. The degree of inclination of the carrier 16 and its parts may be modified at will, and obviously assists in the separation of the seeds which are deposited on the plates 19. As the carrier 16 is reciprocated, as heretofore noted, the seeds are separated, the weed seeds passing over the front edges of the plates 19, as indicated by the arrows 53, and the seeds desired to be conserved moving straight across the plate, as indicated by the arrows 54 in Fig. 3, the mass of seeds being directed towards the forward edges of the plates 19 and the lower ends of the latter by the inclination of the carrier 16 which will be effective in the seed separation sought by the reciprocation of the carrier through the operation of the cam 34 and spring 27 during which operations there are successive jars imparted to the carrier, and by this means a practical separation operation ensues and the seeds desired to be conserved pass from the plates 19 and are discharged into the hopper 42 and through its pipe 43, and the weed seed or other separated seed is discharged from the lower end partitions 18 into and through the passages 37, and then to the hopper 40 and out through the pipe 41.

The flanges 20 at the rear ends of the separators or plates 19 prevent the seed from working off or becoming discharged irregularly at the said rear ends of the said plates 19, and thereby are forced to follow the course just explained. The flexible tubes 13 permit the carrier to conform to the reciprocation or give the carrier an unretarded sensitive operation and still maintain the feed of the seed as a mass by way of the openings 15 on the plates 19 and take the separating course above explained.

The flanges 20 of the separators or plates 19 are high enough to prevent blowing over of the seeds directed to and falling off the unflanged sides of the seed plates 19 adjacent to said flanges, and furthermore, these plates 19 as well as the partitions 18 are individually held stationary, but reciprocate as units with the carrier 16. As shown in full lines by Fig. 1, the carrier 16 is in normal position or is moved to the right to its limit, and the dotted line at the left of the carrier 16 the extent of movement of the carrier in its reciprocation as effected by the cam 34 against the resistance of the spring 27 is indicated, and hence the movement of the carrier and of the plates and partitions forming components thereof, is quick, and the cam 34 by its form exerts a pull on the carrier against the resistance of the spring 27, through the bed plate 22 which will be advantageous in effecting the separation of the seeds in the manner heretofore explained. It is preferred that the improved machine be utilized in separating weed seeds from other seeds desired to be conserved, it will be understood that separation of other seeds may be equally well effected by the machine. The reciprocation of the carrier 16 will also materially influence the regular feed of the seed through the elastic tubes or pipes 13 and prevent choking of the latter and thereby practically supply the metal tubes 14 moving with the carrier, and the vibration of the carrier will prevent any tendency to occlusion of the openings 15 which are situated close to one side of the separators or plates 19, as particularly shown by Fig. 2. As heretofore indicated the capacity of the machine will depend altogether on the number of plates 19 and partitions 18, and it is obvious that changes in the minor details of construction as well as in the general proportions and dimensions may be adopted at will without departing from the nature or spirit of the invention or the scope of the appended claims.

What is claimed as new is:—

1. In a machine of the class specified, the combination of a reciprocating carrier having spaced flat separator plates fixed therein and spaced apart at the adjacent sides to provide discharge openings, and partition means under said plates.

2. In a machine of the class specified, comprising a reciprocating carrier canted at an angle and having a series of flat seed separating plates fixed therein and separated at adjacent sides by discharge spaces, partition means under said plates, and means for feeding seed to one end of each of the plates.

3. In a device of the class specified, the combination of a reciprocating carrier tilted at an angle and discharging at one side and one end, said carrier having a series of flat seed separating plates fixed therein and provided with vertical flanges at the rear sides, the said plates having spaces between the contiguous sides to form discharge openings for the seed, flat partition plates separating the said seed separating plates, and means for feeding seeds to the seed separating plates.

4. In a machine of the class specified, the combination of a reciprocating carrier tilted lengthwise at an angle for convenient discharge at one side and at one end, a series of seed separating plates having flanged rear sides and held in fixed separated relation to provide discharge openings, flat partitions arranged under the plates, and means for feeding seeds to one end of each of the seed separating plates.

5. In a machine of the class specified, the combination of a reciprocating carrier tilted at an angle to facilitate discharge at one side and one end, a series of separated plates disposed in the same horizontal plane and arranged in tiers, the plates being flanged at the rear ends of each and separated by spaces between the opposite unflanged ends and the adjacent ends of contiguous plates, partition plates interposed between the seed separating plates, and seed supply means cooperating with the higher ends of the seed separating plates.

6. In a machine of the class specified, the combination of a reciprocating carrier tilted toward one side and having a series of seed separator plates fixed therein and spaced apart in alternation at the forward and rear edges of contiguous plates and forming discharge openings therebetween, the rear ends of all the plates having vertical flanges, flat partition plates below each series of seed separating plates, and seed supplying means consisting of pipes with openings adjacent to the higher ends of the seed separating plates and flexible connections at the upper ends to compensate for the movement of the carrier, mechanism for controlling the movement of the carrier, and means at one end and on the side for receiving the seed discharged from the carrier.

In testimony whereof I have hereunto set my hand.

DAVID FRANKS.